US012169502B1

(12) United States Patent
Abraham et al.

(10) Patent No.: US 12,169,502 B1
(45) Date of Patent: Dec. 17, 2024

(54) PREDICTIVE DATA PROCESSING (71) Applicant: Massachusetts Mutual Life Insurance Company, Springfield, MA (US)

(72) Inventors: Israel Abraham, Springfield, MA (US); Michael Roche, Springfiled, MA (US)

(73) Assignee: Massachusetts Mutual Life Insurance Company, Springfield, MA (US)

( * ) Notice: Subject to any disclaimer, the term of this patent is extended or adjusted under 35 U.S.C. 154(b) by 0 days.

(21) Appl. No.: 17/673,476

(22) Filed: Feb. 16, 2022

(51) Int. Cl.
*G06F 16/25* (2019.01)
*G06F 16/178* (2019.01)

(52) U.S. Cl.
CPC ........ *G06F 16/258* (2019.01); *G06F 16/1794* (2019.01)

(58) Field of Classification Search
CPC ............................ G06F 16/258; G06F 16/1794
See application file for complete search history.

(56) References Cited

U.S. PATENT DOCUMENTS

| | | | | |
|---|---|---|---|---|
| 9,846,716 B1* | 12/2017 | Scott | ................... | G06F 16/2365 |
| 11,256,707 B1* | 2/2022 | Xiong | ..................... | G06N 3/045 |
| 2009/0287758 A1* | 11/2009 | Hamilton, II | .......... | G06Q 10/10 |
| | | | | 709/201 |
| 2011/0179020 A1* | 7/2011 | Ozzie | .................... | G06F 16/958 |
| | | | | 707/723 |
| 2012/0131591 A1* | 5/2012 | Moorthi | ................ | G06F 9/5088 |
| | | | | 718/104 |
| 2017/0006135 A1* | 1/2017 | Siebel | ..................... | G06Q 10/06 |
| 2017/0063826 A1* | 3/2017 | Sundaresan | ....... | G06F 16/24568 |
| 2021/0044499 A1* | 2/2021 | Snyder | ................ | H04L 41/5096 |

\* cited by examiner

*Primary Examiner* — Kris E Mackes
*Assistant Examiner* — Lin Lin M Htay
(74) *Attorney, Agent, or Firm* — Foley & Lardner LLP (57) ABSTRACT

Systems and methods for improving computational efficiency of data processing and storage are disclosed. The system can identify computing devices capable of performing a data transformation process on a data feed of a data repository, and determine an amount of computational resources needed to perform the data transformation process on the data feed based on attributes of the data feed and computational resources used to process historic processing jobs associated with the data feed. The system can dynamically provision, while performing the data transformation process, a subset of the computing devices based on the amount of computational resources, and execute the data transformation process at the subset of the plurality of computing devices to process the data feed. The system can dynamically re-provision the subset of the plurality of computing devices based on a change in the attributes of the data feed.

18 Claims, 3 Drawing Sheets

PREDICTIVE DATA PROCESSING

TECHNICAL FIELD

The subject matter described herein relates generally to systems, methods, and computer-readable media for allocating computational resources for data transformation processes.

BACKGROUND

Traditional cloud computing platforms rely on static provisioning rules to carry out data processing operations. Static provisioning rules generally specify a predetermined cluster of computing devices or computational resources that are required to carry out one or more processing jobs. However, modern processing jobs, particularly processing jobs that execute over large amounts of data from multiple sources, are often dynamic because the data to be processed may change over time. Similarly, because cloud computing platforms are often responsible for carrying out many different types of processing tasks, they may be unsuited to carry out unscheduled or otherwise spontaneous requests for data processing.

SUMMARY

For the aforementioned reasons, what is therefore desired is a technical solution for dynamically provisioning computational resources in distributed computing environments. The systems and methods described herein can dynamically provision and re-provision computing devices in distributed computing environments based on attributes of data feeds that are to be processed and based on computational requirements of historic processing jobs. In addition, the present techniques compensate for changes in the attributes of data feeds undergoing processing by dynamically re-provisioning computing devices as-needed. Similarly, the present techniques can re-provision one or more of the computing devices to carry out other processing jobs simultaneously, which improves the overall computational efficiency and throughput of the computing environment.

At least one aspect of the present disclosure relates to a method for improving computational efficiency of data processing and storage. The method may be performed, for example, by one or more processors coupled to memory, which may be executing a data transformation process. The method can include identifying a plurality of computing devices capable of performing the data transformation process on a data feed of a data repository. The method may include determining based on attributes of the data feed and computational resources used to process a set of historic processing jobs that are associated with the data feed, an amount of computational resources needed to perform the data transformation process on the data feed. The method may include dynamically provisioning, while performing the data transformation process, a subset of the plurality of computing devices based on the amount of computational resources. The method may include executing the data transformation process at the subset of the plurality of computing devices to process the data feed. The method may include dynamically re-provisioning during execution of the data transformation process at the subset of the plurality of computing devices, the subset of the plurality of computing devices based on a change in the attributes of the data feed.

Dynamically re-provisioning the subset of the plurality of computing devices may further include re-provisioning at least one computing device of the subset of the plurality of computing devices for execution of a second processing job. In some implementations, the change in the attributes of the data feed may include a change in an amount of data in the data feed to be processed. In some implementations, the one or more processors may be part of at least one computing device of the plurality of computing devices. In some implementations, the method can further include de-provisioning the subset of the plurality of computing devices after execution of the data transformation process is complete.

The data transformation process may include storing transformed data generated based on the data feed in one or more destination databases. In some implementations, dynamically provisioning the subset of the plurality of computing devices may be further based on one or more parameters provided to the one or more processors. In some implementations, dynamically provisioning the subset of the plurality of computing devices may be further based on computational attributes of the plurality of computing devices.

Dynamically provisioning the subset of the plurality of computing devices may be further based on a type of data processing performed as part of the data transformation process. In some implementations, executing the data transformation process at the subset of the plurality of computing devices over the data feed may further include assigning a respective portion of the data feed to each of the subset of the plurality of computing devices for the data transformation process.

Another aspect of the present disclosure relates to a system configured for improving computational efficiency of data processing and storage. The system may include one or more processors coupled to a non-transitory memory. The system can identify a plurality of computing devices capable of performing the data transformation process on a data feed of a data repository. The system can determine, based on attributes of the data feed and computational resources used to process a set of historic processing jobs that are associated with the data feed, an amount of computational resources needed to perform the data transformation process on the data feed. The system can dynamically provision, while performing the data transformation process, a subset of the plurality of computing devices based on the amount of computational resources. The system can execute the data transformation process at the subset of the plurality of computing devices to process the data feed. The system can dynamically re-provision, during execution of the data transformation process at the subset of the plurality of computing devices, the subset of the plurality of computing devices based on a change in the attributes of the data feed.

Dynamically re-provisioning the subset of the plurality of computing devices may further include re-provisioning at least one computing device of the subset of the plurality of computing devices for execution of a second processing job. In some implementations, the change in the attributes of the data feed may include a change in an amount of data in the data feed to be processed. In some implementations, the one or more processors may be part of at least one computing device of the plurality of computing devices. In some implementations, the system can de-provision the subset of the plurality of computing devices after execution of the data transformation process is complete.

The data transformation process may include storing transformed data generated based on the data feed in one or more destination databases. In some implementations, dynamically provisioning the subset of the plurality of computing devices may be further based on one or more parameters provided to the one or more processors. In some implementations, dynamically provisioning the subset of the plurality of computing devices may be further based on computational attributes of the plurality of computing devices.

Dynamically provisioning the subset of the plurality of computing devices may be further based on a type of data processing performed as part of the data transformation process. In some implementations, executing the data transformation process at the subset of the plurality of computing devices over the data feed may further include assigning a respective portion of the data feed to each of the subset of the plurality of computing devices for the data transformation process.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification. Aspects can be combined and it will be readily appreciated that features described in the context of one aspect of the invention can be combined with other aspects. Aspects can be implemented in any convenient form. For example, by appropriate computer programs, which may be carried on appropriate carrier media (computer readable media), which may be tangible carrier media (e.g. disks or other non-transitory storage media) or intangible carrier media (e.g. communication signals). Aspects may also be implemented using suitable apparatus, which may take the form of programmable computers running computer programs arranged to implement the aspects. As used in the specification and in the claims, the singular form of "a," "an," and "the" include plural referents unless the context clearly dictates otherwise.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings.

DETAILED DESCRIPTION

Reference will now be made to the illustrative embodiments illustrated in the drawings, and specific language will be used here to describe the same. It will nevertheless be understood that no limitation of the scope of the claims or this disclosure is thereby intended. Alterations and further modifications of the inventive features and additional applications of the principles of the subject matter illustrated herein, which would occur to one ordinarily skilled in the relevant art and having possession of this disclosure, are to be considered within the scope of the subject matter disclosed herein. The present disclosure is here described in detail with reference to embodiments illustrated in the drawings, which form a part here. Other embodiments may be used and/or other changes may be made without departing from the spirit or scope of the present disclosure. The illustrative embodiments described in the detailed description are not meant to be limiting of the subject matter presented here.

Conventional data processing techniques rely on static provisioning of computational resources. Typically, a static number of computing devices in a cloud environment are configured by processor-executable instructions to carry out predetermined processing tasks. However, many modern processing tasks are dynamic in nature, and operate over data feeds or sources of information that change over time. In addition, cloud computing systems are often responsible for carrying out a variety of processing tasks in an order that may be generally unpredictable or unscheduled. Because the computing devices that are configured to carry out these tasks are static, conventional cloud computing systems are unable to compensate when a large number of processing tasks are received.

The systems and methods of this technical solution solve these and other issues by providing dynamic provisioning of computational resources in a cloud computing environment. The systems and methods described herein can perform dynamic provisioning and re-provisioning of computing devices based on the attributes of various data feeds that are to be processed. If the attributes of those data feeds change, the systems and methods described herein can dynamically re-provision the computing devices of the cloud computing environment to compensate for the change, by either reducing the number of computing devices processing the data, or by provisioning additional computing devices to process additional data that may have been added to the data feed.

In addition, the systems and methods of this technical solution can analyze records of historic processing jobs to estimate the computational resources required to carry out a requested processing job. Information from historic processing jobs, along with the attributes of the data feeds that are to be processed, can be used to predict the amount of processing resources needed to process the data feed within a reasonable (or specified) time period. Once the amount of required computational resources have been determined, the systems and methods described herein can provision a subset of the computing devices in the cloud computing environment to satisfy the required computational resource, and begin executing the requested processing job using the provisioned computing devices. As the processing job is being executed, the systems and methods described herein can dynamically re-provision one or more of the computing devices as additional processing jobs are requested. Accordingly, the present techniques extend the functionality of conventional cloud computing systems by dynamically provisioning computing devices to perform requested processing jobs. Doing so improves the overall processing throughput of the cloud computing system, and is therefore an improvement over conventional cloud computing techniques.

Figure 1:
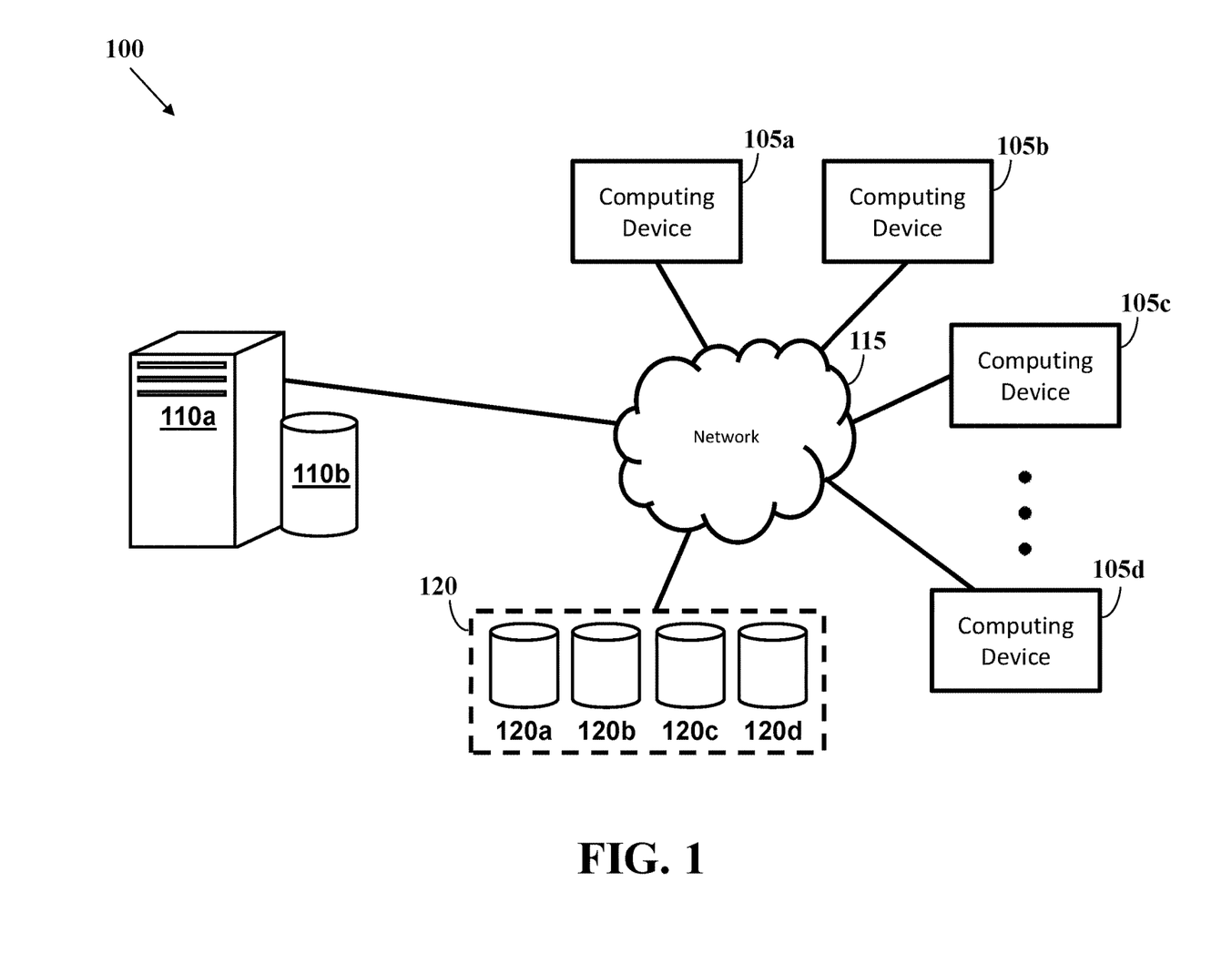
FIG. 1 illustrates various components of a system for improving computational efficiency of data processing and storage, in accordance with an embodiment.

FIG. 1 illustrates various components of a system 100 for improving computational efficiency of data processing and storage, in accordance with an embodiment. The system 100 may include an analytics server 110a, system database 110b, one or more computing devices 105a-d (collectively computing devices 105), and electronic data sources 120a-d (collectively electronic data sources 120). End-user devices (not pictured, sometimes referred to herein as client devices)

or administrator computing devices (not pictured) may also be present in the system 100. Various components depicted in FIG. 1 may be part of a cloud computing system, which may be used to perform high-volume or high-performance computing operations, including data transformation processes.

The above-mentioned components may be connected to each other through a network 115. Examples of the network 115 may include, but are not limited to, private or public local-area-networks (LAN), wireless LAN (WLAN) networks, metropolitan area networks (MAN), wide-area networks (WAN), and the Internet. The network 115 may include wired and/or wireless communications according to one or more standards or via one or more transport mediums. The network 115 may be composed of multiple connected sub-networks or AS networks, which may meet at one or more of: an intervening network (a transit network), a dual-homed gateway node, a point of presence (POP), an Internet exchange Point (IXP), and/or additional other network boundaries. The network 115 can be a metropolitan area network (MAN or a peer-to-peer network, e.g., an ad hoc Wi-Fi peer-to-peer network. The data links between nodes in the network 115 may be any combination of physical links (e.g., fiber optic, mesh, coaxial, twisted-pair such as Cat-5 or Cat-6, etc.) and/or wireless links (e.g., radio, satellite, microwave, etc.).

The network 115 can include carrier networks for mobile communication devices, e.g., networks implementing wireless communication protocols such as the Global System for Mobile Communications (GSM), Code Division Multiple Access (CDMA), Time Division Synchronous Code Division Multiple Access (TD-SCDMA), Long-Term Evolution (LTE), or any other such protocol including so-called generation 3G, 4G, 5G, and 6G protocols. The network 115 can include short-range wireless links (e.g., via Wi-Fi, BLUETOOTH, BLUETOOTH LOW ENERGY (BLE), ZIGBEE, etc.), sometimes referred to as a personal area network (PAN) or mesh network. The network 115 may be public, private, or a combination of public and private networks. The network 115 may be any type and/or form of data network and/or communication network.

The network 115 can include a network interface controller that can manage data exchanges with devices in the network 115 via a network interface (sometimes referred to as a network interface port). The network interface controller handles the physical and data link layers of the Open Systems Interconnection (OSI) model for network communication. In some arrangements, some of the network interface controller's tasks are handled by one or more processing circuits. In various arrangements, the network interface controller is incorporated into the one or more processing circuits, e.g., as circuitry on the same chip. In some arrangements, the network interface controller supports wireless network connections and an interface is a wireless (e.g., radio) receiver/transmitter (e.g., for any of the IEEE 802.11 Wi-Fi protocols, near field communication (NFC), BLUETOOTH, BLE, ZIGBEE, ANT, or any other wireless protocol). In various arrangements, the network interface controller implements one or more network protocols such as Ethernet.

The system 100 is not confined to the components described herein and may include additional or other components, not shown for brevity, which are to be considered within the scope of the embodiments described herein.

The communication over the network 115 may be performed in accordance with various communication protocols such as Transmission Control Protocol and Internet Protocol (TCP/IP), User Datagram Protocol (UDP), and IEEE communication protocols. In one example, the network 115 may include wireless communications according to Bluetooth specification sets or another standard or proprietary wireless communication protocol. In another example, the network 115 may also include communications over a cellular network, including, e.g., a GSM (Global System for Mobile Communications), CDMA (Code Division Multiple Access), or EDGE (Enhanced Data for Global Evolution) network.

The analytics server 110a may coordinate or provision execution of various data transformation processes over information stored in the data sources 120. The analytics server 110a can assign portions of a data feed to one or more of the computing devices 105, which can perform the data transformation process on the data feed and store the transformed data in one or more of the data sources 120. In some implementations, the analytics server 110a can perform any of the functionality of the computing devices 105, including the execution of the data transformation process. The analytics server 110a may receive one or more processing jobs from a client device via the network 115. For example, the analytics server 110a can provide an electronic platform to an end-user device, which may include graphical user interfaces (GUI). An example of the electronic platform generated and hosted by the analytics server 110a may be a web-based application or a website configured to be displayed on different electronic devices, such as mobile devices, tablets, personal computers, and the like. The electronic platform may display various analytical information in user interfaces, which may be used to schedule or coordinate processing jobs or specified data transformation processes. Data to be transformed, such as particular data stored in the data sources 120, may also be specified via the electronic platform hosted by the analytics server 110a. The information displayed by the electronic platform can include, for example, the status or progress of one or more processing jobs, or characteristics or electronic logs of how the data transformation process has been provisioned across the computing devices 105. The analytics server 110a may also execute various software components that accept queries or requests from the other computing devices of the system 100, such as the electronic data sources 120, end-user devices, or an administrator computing device.

The analytics server 110a may host a website or another type of interface accessible to users operating any of the electronic devices described herein, where the content presented via the various webpages may be controlled based upon each particular user's role or viewing permissions. The analytics server 110a may be any computing device comprising a processor and non-transitory machine-readable storage capable of executing the various tasks and processes described herein. The analytics server 110a may employ various processors such as central processing units (CPUs), graphics processing units (GPUs), or field-programmable gate arrays (FPGAs), among others. Non-limiting examples of such computing devices may include servers or workstation computers and the like. While the system 100 includes a single analytics server 110a, the analytics server 110a may include any number of computing devices operating in a distributed computing environment, such as a cloud environment. Furthermore, instead of or in addition to using front-end applications for the various engines, in some embodiments client devices may access various resources of the analytics server 110a directly using various standards, such as HTTP packages, Java APIs, JavaMail API, Java Data Objects (JDO), Java Persistence API (JPA), Python APIs, or web integration APIs for different programming languages including, e.g., Rack for Ruby, WSGI for Python, or PSGI for Perl, or other APIs that may be built on REST, HTTP, XML, or other protocols.

The analytics server 110a may be configured to require user authentication based upon a set of user authorization credentials (e.g., username, password, biometrics, cryptographic certificate, and the like) in order to access the functionality of the analytics server 110a. The analytics server 110a may access the system database 110b configured to store user credentials, which the analytics server 110a may be configured to reference in order to determine whether a set of entered credentials (purportedly authenticating the user) match an appropriate set of credentials that identify and authenticate the user.

The analytics server 110a may generate and host webpages based upon a particular user's role within the system 100. In such implementations, the user's role may be defined by data fields and input fields in user records stored in the system database 110b. The analytics server 110a may authenticate the user and may identify the user's role by executing an access directory protocol (e.g., LDAP). The analytics server 110a may generate webpage content that is customized according to the user's role defined by the user record in the system database 110b. For example, a particular user may have authorization to access to information generated by the analytics server 110a to perform particular data transformation processes or to process particular data stored in the system database 110b or the data sources 120.

The analytics server 110a can provide resource pooling to serve multiple client devices through a multi-tenant environment or multi-tenant model with different physical and virtual resources dynamically assigned and reassigned responsive to different demands within the respective environment. Each client device may transmit a corresponding request to perform one or more data transformation processes using the analytics server 110a and the computing devices 105. A multi-tenant analytics server 110a can include a system or architecture that can provide a single instance of software, an application, or a software application to serve multiple users. In some embodiments, the analytics server 110a can provide on-demand self-service to unilaterally provision computing capabilities (e.g., server time, network storage) across a network for multiple client devices.

The electronic data sources 120 may represent various electronic data sources that contain, retrieve, and/or access data associated with data feeds from multiple data sources. Any type of information may be maintained by the electronic data sources 120 in one or more corresponding data structures. The information stored in the electronic data sources 120 can be stored in association with one or more attributes, which may specify the type, quantity, and size of one or more data items stored at the electronic data sources 120. Information stored in an electronic data source may be referred to as a "data feed." In some implementations, a data feed may be updated in real-time by other computing devices via the network 115. Any of the information in the data sources 120 can be accessed by the analytics server 110a or the computing devices 105. For instance, the analytics server 110a or the computing devices 105 may communicate with the data sources 120 via the network 115 to retrieve/receive data associated with, or forming a part of, one or more data feeds.

End-user devices or client devices may be any computing device comprising a processor and a non-transitory machine-readable storage medium capable of performing the various tasks and processes described herein. Non-limiting examples of an end-user device may be a workstation computer, laptop computer, tablet computer, or server computer. In operation, various users may use end-user devices to access the GUI operationally managed by the analytics server 110a. Specifically, the end-user devices may access the analytics server 110a to request that various processing jobs, including data transformation processes over specified data feeds, be performed. The end-user devices can access the various functionality of the analytics server 110a via the electronic platform described herein. In some implementations, the functionality of the analytics server 110a may be accessed via an intermediary computing device or computing server, which provides the electronic platform and communicates corresponding data processing requests to the analytics server 110a.

An administrator computing device may represent a computing device operated by a system administrator. The administrator computing device may be configured to display various aspects of the data transformation processes provisioned by the analytics server 110a (e.g., various analytical metrics including system performance, number of the computing devices 105 provisioned to perform various data transformation processes, etc.); monitor execution of data transformation processes provisioned the analytics server 110a over data stored in the electronic data sources 120, and/or administer or modify various provisioning rules for the analytics server 110a.

Each of the computing devices 105 can employ various processors such as central processing units (CPUs), graphics processing units (GPUS), or field-programmable gate arrays (FPGAs), among others. Non-limiting examples of such computing devices may include servers or workstation computers and the like. The analytics server 110a and the computing devices 105 may be implemented as part of a cloud computing environment, an on-premises ("on-prem") computing environment, or a hybrid computing environment including one or more on-prem computing environments and one or more cloud computing environments. The computing devices 105 can perform various data transformation processes, as described herein. Some non-limiting examples of data transformation processes can include data transfer and storage, data formatting, and machine learning processing, among others. The computing devices 105 may be provisioned via communications with the analytics server 110a. For example, the analytics server 110a may communicate portions of data to process, or a source of a particular dataset to process using an identified data processing technique, as well as a destination storage location to store the results of any data transformation processes described herein. In some implementations, more than one of the computing devices 105 can be provisioned to complete a data transformation process on a large amount of data. For example, many computing devices 105, as described herein, may be provisioned to process an amount of data that would be impracticable for one computing device 105 to process. The computing devices 105 therefore leverage parallel processing capabilities of the system 100 when processing large amounts of information from multiple sources.

In some implementations, one or more of the computing devices 105 may execute on a single machine, for example, as a virtual device. Virtual devices may share the same machine and may execute code or perform other operations via a Hypervisor, and may otherwise appear to perform data transformation processes as if the virtual machine were an actual computing device. Similarly, in some implementations, one or more of the computing devices 105 may include multiple servers, processors, or computing devices. The computing devices 105 may be part of a cloud computing environment, and may share one or more common internet protocol (IP) addresses. Although the computing devices 105 and the analytics server 110a of the system 100 are shown in a star configuration (e.g., all connected to a central network 115), it should be understood that any number of networks or configurations are possible, such as mesh configurations, star configurations, bus configurations, ring configurations, or hybrid configurations, among others. The analytics server 110a may communicate with the computing devices 105 via the network 115 to perform the techniques described herein.

Figure 2:
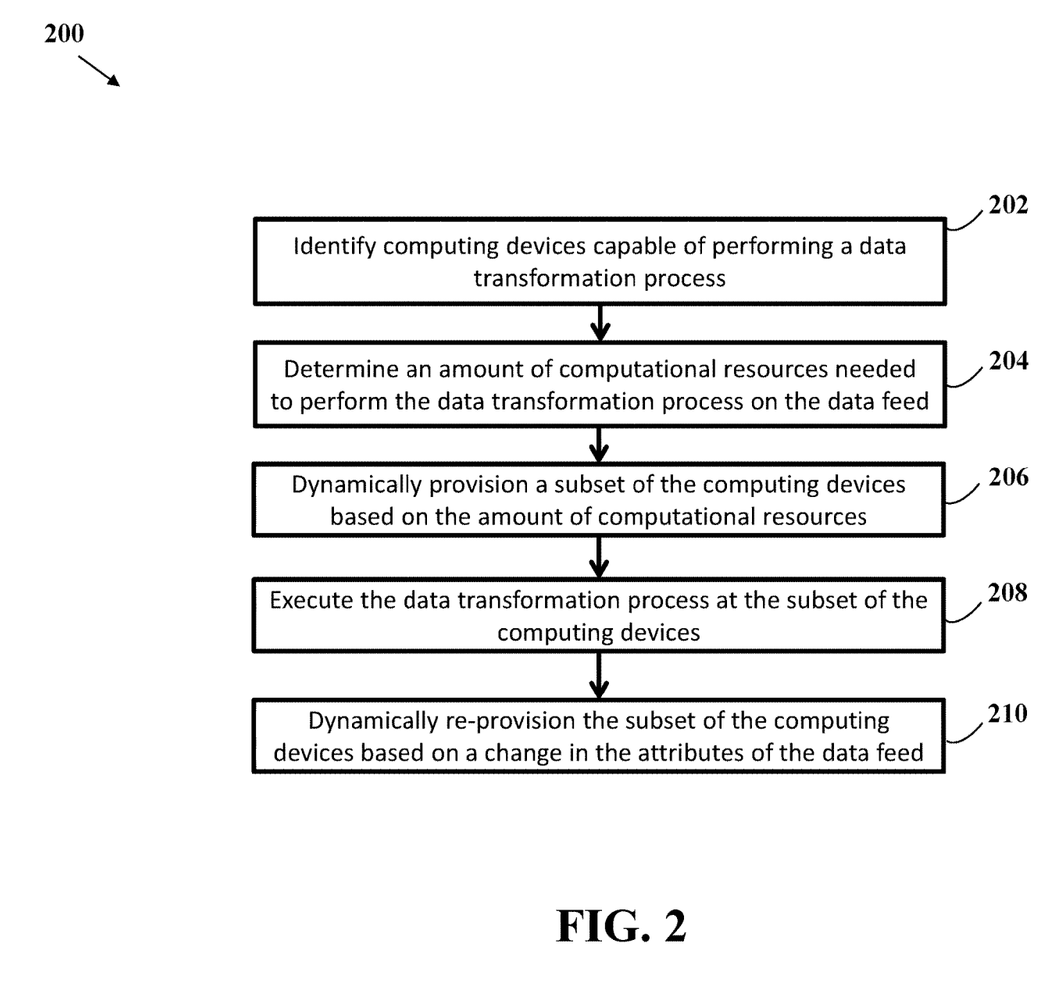
FIG. 2 illustrates a flow diagram of a method for improving computational efficiency of data processing and storage, in accordance with an embodiment.

FIG. 2 illustrates operational steps of a method 200 executed by the analytics server 110a of FIG. 1, to improve computational efficiency of data processing and storage in accordance with an embodiment. The method 200 may be performed by any component of the system 100, such as the analytics server 110a or one or more of the computing devices 105. However, one or more steps of method 200 may be executed by any number of computing devices operating in the distributed computing system described in FIG. 1. For instance, one or more computing devices may locally perform part or all of the steps described in FIG. 2 or a cloud device may perform such steps.

At step 202, the method 200 includes identifying one or more computing devices (e.g., the computing devices 105 of FIG. 1) capable of performing a data transformation process on a data feed of a data repository (e.g., one or more of the data sources 120). As described herein, the analytics server may receive a request from a client device or another computing device via a network to perform a data transformation process. Some examples of the data transformation process can include retrieving data from multiple sources (e.g., the data sources 120 of FIG. 1), which may be stored in a non-standard format, storing the data in a standard format at a specified output location, performing machine learning processing, executing one or more algorithms over specified data, executing user-provided executable-code over specified data, or other data processing operations. Generally, the data processing operations may be data processing operations that operate over large amounts of information, and therefore benefit from parallel processing or processing by a group (sometimes called a "cluster") of computing devices.

The request to perform the data transformation process may include executable code specifying the data transformation process, as well as processing parameters of the data transformation process. Some non-limiting examples of the data transformation process can include a location at which data to process is stored, an output location storage location to store the output of the data transformation process, an amount of data to process with the data transformation process, an execution time for the data transformation process, or a number of computing devices that should execute the data transformation process, among others.

Upon receiving the request to perform the data transformation process, the analytics server can identify one or more of the computing devices 105 that can identify one or more computing devices that are available to perform the data transformation process. For example, the analytics server may access a list of computing devices from a lookup table that stores identifiers of respective computing devices with a respective status value (e.g., available, busy, under maintenance, etc.). From this lookup table, the analytics server can determine which of the computing devices are available to perform the data transformation process. In some implementations, the analytics server may identify the computing devices as compatible with the particular data transformation process. For example, the data transformation process may be a process that is compiled for, and can only be executed on, a Linux-based operating system. Furthering this example, the analytics server can identify the computing devices that are available and are running a Linux operating system (e.g., as indicated in a lookup table or database, etc.).

It should be understood that this is used only as an example, and that other conditions of a computing device may be evaluated to identify the computing device as capable of performing the data transformation process. Some non-limiting examples of such conditions can include operating system, processing capability, processor type or architecture, amount of memory, amount of storage, computing device maintenance schedule, and scheduled processing jobs for the computing device, among other computing device conditions. Generally, the analytics server can compare one or more of such properties of each computing device to one or more specified requirements of the data transformation process to identify which of the computing devices are capable of performing the data transformation process. The analytics server can generate a list of computing devices that it identifies as capable of performing the data transformation process, and can store the list of computing devices in one or more data structures in the memory of the analytics server. The analytics server can begin performing, and indeed may be performing, the data transformation process on at least a portion of the data feed while performing the steps of the method 200.

At step 204, the method 200 includes determining, based on attributes of the data feed and computational resources used to process a set of historic processing jobs that are associated with the data feed, an amount of computational resources needed to perform the data transformation process on the data feed. The analytics server can maintain lists of prior processing tasks that have been performed using the computing devices described herein. The historic records of prior processing jobs can include, for example, information about a duration to complete the previous processing jobs, indications of which computing devices were used to carry out the processing jobs, an indication of the number of computing devices used to process the previous processing jobs, information relating to the data of prior processing jobs (e.g., amount of data, source of the data, destination of the data, etc.), information about an amount of computational resources (e.g., computation time, computational processor load, memory usage, storage usage, etc.) to perform the processing job at each computing device, and information about the type of data transformations performed as part of the previous processing jobs, among others.

The historic records of prior processing jobs may be stored in one or more databases (e.g., the data repository 110b), and may be keyed by one or more of the foregoing attributes of the processing jobs. By accessing the historic records of previous processing jobs using the parameters or attributes of the data transformation process specified in the request, the analytics server can generate a list of prior processing jobs with similar characteristics to the data transformation process. To access similar records, the analytics server can retrieve one or more historic processing jobs using any of the parameters of the data transformation process specified in the request. If multiple key values are used, then the returned lists of prior processing jobs may be concatenated together to form a single list of prior processing jobs. The analytics server can calculate an average of the computational resources of the retrieved list of prior processing jobs to determine an amount of computational resources that may be required to process the data transformation process specified in the request.

In addition, the analytics server can evaluate the attributes of the data feed over which the data transformation process will be executed when determining the amount of computational resources needed to perform the data transformation process. To do so, the analytics server can query the data source that maintains the data feed to request an amount of information that is available to process. Other attributes can include a number of items of data in the data feed that are to be processed using the data transformation technique, the size of each item of data to be processed using the data transformation technique, or an amount of processing required for each item of data in the data feed (e.g., if certain data items require additional processing, or different amounts of processing than other data items in the data feed). A data item can be any data structure, file, or other portion of data that is to be transformed using the specified data transformation process. In some implementations, the attributes of the data feed that is to be processed using the data transformation process can be compared against the attributes of the historic processing jobs to calculate a corresponding relative weight value for each of the historic processing jobs. The weight value can correspond to a similarity between the attributes of the data feeds processing in each of the historic processing jobs and the data feed specified in the request. The weigh values can be used to adjust the contribution of the computational resources of each historic processing job when calculating the amount of computational resources to perform the data transformation process. For example, the computational resources can be calculated by calculating a weighted average of the computational resources used in the retrieved historic processing jobs.

Calculating the computational resources used to perform the data transformation process can include, for example, calculating a number of computing devices to provision to perform the data transformation process, calculating a number of clusters of computing devices to perform the data transformation process, calculating a number of computing devices in each cluster to perform the data transformation process, determining a number of processes to execute on each computing device to perform the data transformation process, determining an amount of memory to allocate on each computing device, or determining an estimated time to complete the processing job, among others. One or more of these values can be used to provision the computing devices in later processing steps.

The analytics server can compare the parameters specified in the request and the attributes of the data feed to corresponding values in the records of historic processing jobs to calculate a respective similarity score for each of the processing jobs. If the analytics server determines that a similarity score for a particular historic processing job exceeds a threshold (e.g., the requested data transformation process is substantially similar to a previous processing job, within a predetermined threshold amount), the analytics server can simply utilize the required computational resources of the corresponding historic processing job as the required computational resources for the present processing job. Accordingly, using the foregoing techniques, the analytics server can estimate an amount computational resources that can be allocated to carry out the data transformation process.

At step 206, the method 200 includes dynamically provisioning, by the one or more processors while performing the data transformation process, a subset of the identified computing devices based on the amount of computational resources required to perform the data transformation process. As described herein, the analytics server can utilize both historic records of processing jobs and the attributes of the data feed on which the data transformation process is being performed to determine an amount of computational resources required to process the data feed. In addition, by this step, the analytics server has identified all computing devices that are available and compatible (e.g., capable) of performing the data transformation process. In some implementations, one or more of the computing devices may still be available and compatible even if the computing device is executing a different data transformation process (e.g., a different computer program or executable instructions, etc.), if the different data transformation process does not exhaust the computing resources (e.g., processor time, memory, storage, etc.) of that computing device. As such, the analytics server can maintain a record of the amount of available computing resources (e.g., computational attributes) of each available and compatible computing device and use said information to provision a subset of the computing devices to carry out the data transformation process.

To dynamically provision the computing devices to carry out the data transformation process, the analytics server can divide the amount of computational resources required across a subset of the computing devices. For example, provisioning the computing devices can include assigning each computing device a portion of the data feed on which to perform the data transformation process. To provision the computing devices to process the portion of the data feed, the analytics server can transmit code or instructions to carry out the data transformation process and an identifier of the portion of the data feed (and source(s) of the data feed) to corresponding computing devices that are available. The number of computing devices to provision may be selected based on one or more parameters provided to the analytics server (e.g., the request may specify a number of computing devices). In some implementations, the number of computing devices may be selected based on a proportion of the data transformation process that can be performed in parallel. For example, portions of the data transformation process that can be performed in parallel may be provisioned to a large number of computing devices, while portions of the data transformation process that are mostly sequential may be assigned to a small number of high-performance computing devices.

If many sources of data (e.g., more than one data feed, etc.) are being processed in parallel to carry out the data transformation process, the analytics server can dynamically provision the computing devices such each computing device (or a cluster of one or more computing devices) is assigned to process data from a respective data feed. In such implementations, the analytics server can provision any number of computing devices to each data feed in corresponding clusters using the foregoing techniques. In some implementations, the analytics server can dynamically provision the one or more computing devices based on a type of data processing that is being performed as part of the data transformation process. For example, certain computing devices may include processing specialized processing components, such as FPGAs or GPUs, which are specialized to particular processing jobs or processing tasks, such as image processing or machine learning operations. If a portion of the data transformation process includes such a specialized task, the computing devices having those specialized processing components can be provisioned to perform said tasks. The analytics can determine the types of processing to be performed in the data transformation process based on information in the request. Provisioning a computing device to perform the data transformation process can include transmitting executable instructions corresponding to the data transformation process, as well as identifiers of portions of one or more data feeds to process, and a corresponding destination storage locations to store the results of any computations.

The analytics server can provision one or more clusters that each corresponds to a particular step in the data transformation process. In some implementations, the analytics server can specify that the input data feed to one cluster of computing devices can be the output of another cluster of computing devices, for example, based on the executable code or instructions provided in the request. For example, if the executable code includes two different processes, and the output of one process is an input to a second process, the analytics server can utilize the foregoing techniques to provision subsets of the computing devices for each process specified in the request. In some implementations, the analytics server can be a computing device that is provisioned to carry out a portion of the data transformation process, along with the provisioned computing devices.

At step 208, the method 200 includes executing the data transformation process at the subset of the plurality of computing devices to process the data feed. To execute the data transformation process, the analytics server can transmit an indication to each of the provisioned computing devices to begin executing the provisioned portion of the data transformation process. When executing the data transformation process, each of the computing devices can retrieve a corresponding portion of the data feed that has been provisioned to that computing device by the analytics server. The data can be stored in one or more data structure in the memory of each computing device for processing using the executable instructions provided to each computing device. In some implementations, when different computing devices are responsible for different steps of the data transformation process, some of the computing devices may retrieve processed (e.g., intermediary) data from other computing devices (e.g., other clusters assigned particular processing tasks, etc.).

The data transformation process can be any type of process used to manipulate or transform information. For example, the data transformation process can include receiving information, which may be unstructured information, from a number of different sources (e.g., one or more data feeds), and formatting the data into a standard format. The data, now formatted into the standard format, can be stored in one or more destination databases (e.g., one or more of the data sources 120). The data transformation process may also be other types of data transformation processes, such as image processing or machine learning processes (e.g., classification, inference, or prediction based on source data, etc.), among others. To execute the data transformation process, each of the computing devices can execute the machine-executable code provided by the analytics server, which may be included in the request to perform the data transformation process, or retrieved by the analytics server from a storage location specified in the request. Each of the provisioned computing devices can execute their assigned or provisioned portion of the data transformation process (e.g., over the portion of the data feed assigned to that computing device), until all of the data assigned to that computing device has been processed.

Once all of the computing devices have executed their respective portion of the data transformation process, the analytics server can de-provision the computing devices. For example, the analytics server may transmit instructions to each computing device to return to an initial configuration state by deleting or otherwise removing any intermediary data produced while performing the data transformation process. This can include deleting any of the data retrieved from the data feeds, as well as removing any executable instructions provided by the analytics server. In some implementations, de-provisioning the computing devices can include resetting the computing devices to a default configuration, for example, by installing a predetermined image on each of the computing devices such that they may be easily provisioned for other processing tasks.

At step 210, the method 200 includes, during execution of the data transformation process at the subset of the computing devices, dynamically re-provisioning the subset of computing devices based on a change in the attributes of the data feed. The change in the attributes of the data feed may include a change in an amount of data in the data feed that is to be processed. For example, the data in the data feed may be dynamic and changing, and therefore may decrease or increase in size (e.g., number of data items, etc.) as the data transformation process is being performed. In some implementations, if the data feed decreases in size, the analytics server may de-provision a number of computing devices provisioned for the data transformation process that is proportional to the decrease in size of the data feed. Likewise, if the data feed increases in size, the analytics server may provision a proportional number of additional computing devices to compensate for the increased data size.

In some implementations, the analytics server can receive multiple requests for different data transformation processes. However, there may be a limited number of computing devices available to perform certain computational tasks. To compensate for these limitations, the analytics server may re-provision at least one computing device of the computing devices provisioned for the data transformation process to perform a second data transformation process. In some implementations, the analytics server may allow one computing device to execute multiple data transformation processes separately by executing separate instructions over separate data structures in separate regions of computer memory. The processor time used to execute the data transformation processes at the computing device can be shared across both computing devices. If the computing device completes one data transformation process, but a second data transformation process provisioned to that computing device has not yet completed, the analytics server may re-provision the computing device to be completely dedicated to the second data transformation process. Using the foregoing techniques, the analytics server improves the computational efficiency of distributed processing jobs.

Figure 3:
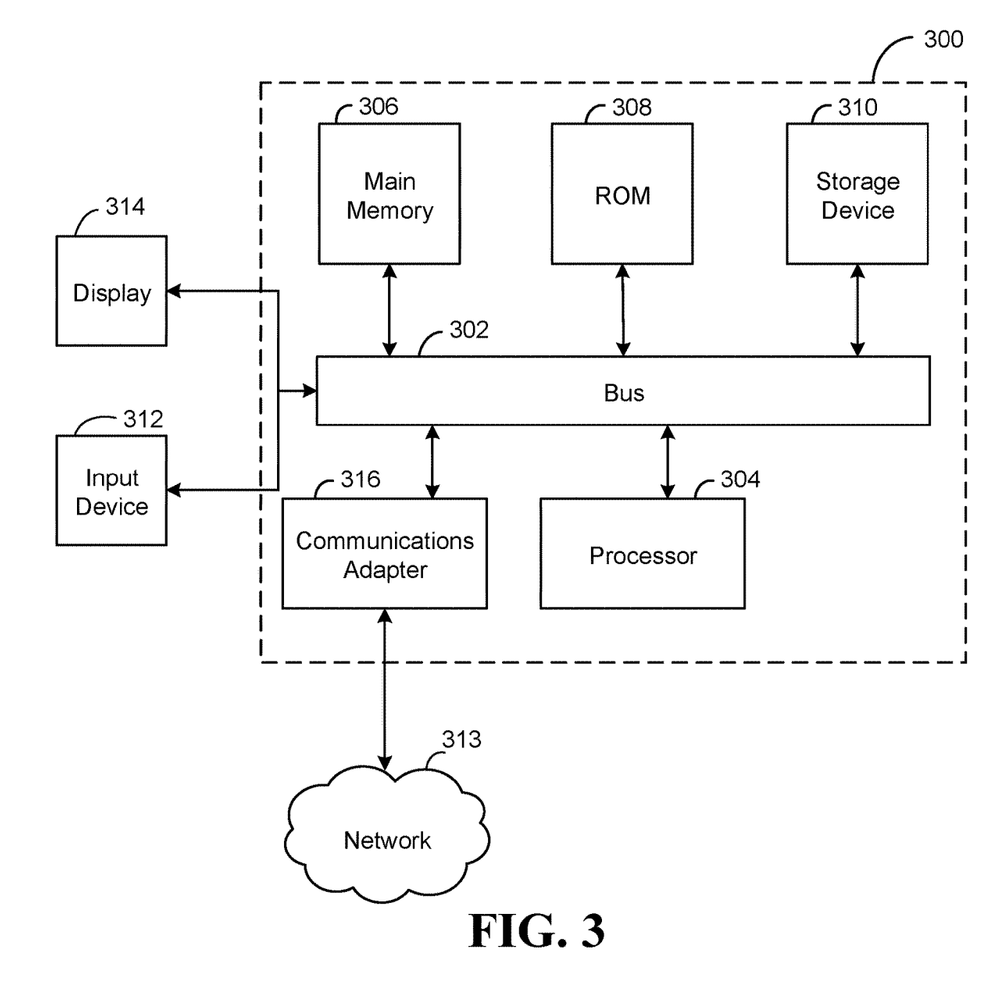
FIG. 3 illustrates components of an example computing system that may be useful in implementing the computing environment of FIG. 1, in accordance with an embodiment.

FIG. 3 is a component diagram of an example computing system 300 suitable for use in the various arrangements described herein. For example, the computing system 300 may be implemented as one or more nodes (computing systems), an example analytics server 110a, and/or various other example systems and devices described in the present disclosure, such as the computing devices 105.

The computing system 300 includes a bus 302 or other communication component for communicating information and a processor 304 coupled to the bus 302 for processing information. The computing system 300 also includes main memory 306, such as a random access memory (RAM) or other dynamic storage device, coupled to the bus 302 for storing information, and instructions to be executed by the processor 304. Main memory 306 can also be used for storing position information, temporary variables, or other intermediate information during execution of instructions by the processor 304. The computing system 300 may further include a read only memory (ROM) 308 or other static storage device coupled to the bus 302 for storing static information and instructions for the processor 304. A storage device 310 is coupled to the bus 302 for persistently storing information and instructions. The storage device 310 can include one or more hard disk drives (HDDs) or other magnetic or optical storage media, one or more solid state drives (SSDs) such as a flash drive or other solid state storage media, one or more hybrid magnetic and solid state drives, one or more virtual storage volumes, such as a cloud storage, or a combination of such physical storage volumes and virtual storage volumes or arrays thereof.

The computing system 300 may be coupled via the bus 302 to a display 314, such as a liquid crystal display or active matrix display, for displaying information to a user. An input device 312, such as a keyboard including alphanumeric and other keys, may be coupled to the bus 302 for communicating information, and command selections to the processor 304. In another arrangement, the input device 312 has a touch screen display. The input device 312 can include any type of biometric sensor; a cursor control, such as a mouse or trackball; or cursor direction keys for communicating direction information and command selections to the processor 304 and for controlling cursor movement on the display 314.

In some embodiments, the computing system 300 may include a communications adapter 316, such as a networking adapter. The communications adapter 316 may be coupled to a bus 302 and may be configured to enable communications with a computing or communications network 313 and/or other computing systems. In various illustrative arrangements, any type of networking configuration may be achieved using communications adapter 316, such as wired (e.g., via Ethernet), wireless (e.g., via Wi-Fi, Bluetooth), satellite (e.g., via GPS) pre-configured, ad-hoc, LAN, or WAN and the like.

In some embodiments, all or some components of the computing system 300 are implemented as cloud-based or virtualized components rather than stand-alone and/or physical components. In some embodiments, a co-tenancy model may be used to host some or all components of the computing system 300. For example, in some embodiments, the processor 304, main memory 306, read-only memory 308, and/or the storage device 310 may be a logical entity sharing one or more physical resources with other entities. In some embodiments, the computing system 300 may be an instantiated collection of virtualized resources in an infrastructure-as-a-service, platform-as-a-service, desktop-as-a-service, or a similar resource provisioning schema. In some embodiments, the computing system 300 may include control circuitry structured to assign resources, such as user space, processing resources, memory resources, etc., to the operating system(s) and/or application(s) executed on the computing system 300.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the methods and embodiments described herein. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module, which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present subject matter. Various modifications to these embodiments will be readily apparent to those skilled in the art, and the generic principles defined herein may be applied to other embodiments without departing from the spirit or scope of the subject matter. Thus, the present subject matter is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

What is claimed is:

1. A method for improving computational efficiency of data processing and storage, the method comprising:
    identifying, by one or more processors coupled to a non-transitory memory that is executing a data transformation process, a plurality of computing devices capable of performing the data transformation process on a data feed of a data repository;
    determining, by the one or more processors, based on attributes of the data feed and computational resources used to process a set of historic processing jobs that are associated with the data feed, an amount of computational resources needed to perform the data transformation process on the data feed;
    dynamically provisioning, by the one or more processors while performing the data transformation process, a subset of the plurality of computing devices based on the amount of computational resources;
    executing, by the one or more processors, the data transformation process at the subset of the plurality of computing devices to process the data feed;
    detecting, by the one or more processors and during execution of the data transformation process, an update to the data feed indicating that an amount of additional data has been added to the data feed for processing using the data transformation process; and
    upon determining, by the one or more processors, based on the amount of the additional data indicated in the update, that a second amount of computational resources are required to process the additional data of the data feed using the data transformation process, dynamically provisioning, by the one or more processors, during execution of the data transformation process at the subset of the plurality of computing devices, a second subset of the plurality of computing devices to process additional data of the data feed, the second subset of the plurality of computing devices selected according to the amount of the additional data added to the data feed.

2. The method of claim 1, wherein dynamically re-provisioning the subset of the plurality of computing devices further comprises re-provisioning at least one computing device of the subset of the plurality of computing devices for execution of a second processing job.

3. The method of claim 1, wherein the one or more processors are part of at least one computing device of the plurality of computing devices.

4. The method of claim 1, further comprising de-provisioning, by the one or more processors, the subset of the plurality of computing devices after execution of the data transformation process is complete.

5. The method of claim 1, wherein the data transformation process comprises storing transformed data generated based on the data feed in one or more destination databases.

6. The method of claim 1, wherein dynamically provisioning the subset of the plurality of computing devices is further based on one or more parameters provided to the one or more processors.

7. The method of claim 1, wherein dynamically provisioning the subset of the plurality of computing devices is further based on computational attributes of the plurality of computing devices.

8. The method of claim 1, wherein dynamically provisioning the subset of the plurality of computing devices is further based on a type of data processing performed as part of the data transformation process.

9. The method of claim 1, wherein executing the data transformation process at the subset of the plurality of computing devices over the data feed further comprises assigning, by the one or more processors, a respective portion of the data feed to each of the subset of the plurality of computing devices for the data transformation process.

10. A system for improving computational efficiency of data processing and storage, the system comprising:
    one or more processors coupled to a non-transitory memory, the one or more processors configured to:
        identify a plurality of computing devices capable of performing a data transformation process on a data feed of a data repository;
        determine, based on attributes of the data feed and computational resources used to process a set of historic processing jobs that are associated with the data feed, an amount of computational resources needed to perform the data transformation process on the data feed;
        dynamically provision, while performing the data transformation process, a subset of the plurality of computing devices based on the amount of computational resources;
        execute the data transformation process at the subset of the plurality of computing devices to process the data feed;
        detect, during execution of the data transformation process, an update to the data feed indicating that an amount of additional data has been added to the data feed for processing using the data transformation process; and
        upon determining, by the one or more processors, based on the amount of the additional data indicated in the update, that a second amount of computational resources are required to process the additional data of the data feed using the data transformation process, dynamically provision, during execution of the data transformation process at the subset of the plurality of computing devices, a second subset of the plurality of computing devices to process the additional data of the data feed, the second subset of the plurality of computing devices selected according to the amount of additional data added to the data feed.

11. The system of claim 10, wherein the one or more processors are further configured to dynamically re-provision the subset of the plurality of computing devices by re-provisioning at least one computing device of the subset of the plurality of computing devices for execution of a second processing job.

12. The system of claim 10, wherein the one or more processors are part of at least one computing device of the plurality of computing devices.

13. The system of claim 10, wherein the one or more processors are further configured to de-provision the subset of the plurality of computing devices after execution of the data transformation process is complete.

14. The system of claim 10, wherein the data transformation process comprises storing transformed data generated based on the data feed in one or more destination databases.

15. The system of claim 10, wherein the one or more processors are further configured to dynamically provision the subset of the plurality of computing devices further based on one or more parameters provided to the one or more processors.

16. The system of claim 10, wherein the one or more processors are further configured to dynamically provision the subset of the plurality of computing devices further based on computational attributes of the plurality of computing devices.

17. The system of claim 10, wherein the one or more processors are further configured to dynamically provision the subset of the plurality of computing devices further based on a type of data processing performed as part of the data transformation process.

18. The system of claim 10, wherein the one or more processors are further configured to execute the data transformation process at the subset of the plurality of computing devices over the data feed by assigning a respective portion of the data feed to each of the subset of the plurality of computing devices for the data transformation process.

* * * * *